United States Patent [19]

Takeda et al.

[11] Patent Number: 4,795,672

[45] Date of Patent: Jan. 3, 1989

[54] MAGNETIC RECORDING MEDIUM

[75] Inventors: Naohiro Takeda, Yokohama; Yuzo Otani, Tokyo; Masahiro Kita, Machida; Nariaki Okajima, Yokohama, all of Japan

[73] Assignee: Diafoil Company, Limited, Tokyo, Japan

[21] Appl. No.: 22,088

[22] Filed: Mar. 5, 1987

[30] Foreign Application Priority Data

Mar. 31, 1986 [JP] Japan ................................. 61-73943

[51] Int. Cl.$^4$ ............................................. G11B 5/70
[52] U.S. Cl. ..................................... 428/216; 427/44; 427/130; 427/128; 427/131; 428/215; 428/425.9; 428/480; 428/336; 428/694; 428/695; 428/900
[58] Field of Search ..................... 428/425.9, 480, 694, 428/695, 900, 336, 913, 215, 216; 427/128, 131, 44, 130; 360/134–136

[56] References Cited

U.S. PATENT DOCUMENTS

| | | | |
|---|---|---|---|
| 4,468,436 | 8/1984 | Okita | 428/900 |
| 4,596,747 | 6/1986 | Nishimatsu | 427/44 |
| 4,612,244 | 9/1986 | Kaneda | 428/323 |
| 4,619,856 | 10/1986 | Kamada | 428/323 |
| 4,634,633 | 1/1987 | Ninomiya | 427/131 |
| 4,664,965 | 5/1987 | Okita | 428/900 |

Primary Examiner—Ellis P. Robinson
Attorney, Agent, or Firm—Oblon, Fisher, Spivak, McClelland & Maier

[57] ABSTRACT

Disclosed herein is a magnetic recording medium comprising a substrate polyester film having on both sides or one side thereof a coating layer comprising a polyurethane having anionic group or a mixture of a polyurethane having anionic group and a polyester having sulfonic group, and an electron radiation cured magnetic layer formed on said coating layer.

7 Claims, No Drawings

MAGNETIC RECORDING MEDIUM

BACKGROUND OF THE INVENTION

The present invention relates to a magnetic recording medium. More particularly, the present invention relates to a magnetic recording medium which is markedly improved in adhesion between the substrate polyester film and the electron radiation cured magnetic layer by providing therebetween a coating layer comprising a polyurethane having anionic group or a mixture of a polyurethane having anionic group and a polyester having sulfonic group.

Biaxially oriented polyester films, especially biaxially oriented polyethylene terephthalate films have been popularly used as substrates for magnetic tapes, magnetic cards, magnetic discs, etc., due to their excellent mechanical strength, dimensional stability, heat resistance, chemical resistance and other advantageous properties. In the magnetic layer of conventional magnetic recording media, a heat-reactive compound such as a polyisocyanate has been blended as a binder for improving the adhesion of the magnetic layer to the substrate. The conventional heat-reactive compounds, however, have required not only heating but also long-time aging for effecting satisfactory curing. Also, some types of heat-reactive compounds such as polyisocyanates are cured even at normal temperature in the presence of water, so that great care must be given to the adjustment of water in the magnetic coating material or the prevention of its deterioration in the course of time in storage. As a measure to eliminate such difficulties in treatment of the conventional heat-reactive compounds as possible resultant scattering of properties of the produced magnetic recording media and the rise of cost due to the necessity of using much time and energy, various proposals and studies have been made recently on the use of the compounds curable with active rays such as ultraviolety rays or electron radiations as a binder for the magnetic layer. As the heat-reactive compounds curable with such active rays, there have been used the compounds having vinyl group as reactive group, but such compounds, when polymerized into a polymeric compound, would prove unsatisfactory in adhesiveness to the substrate polyester film. For improving the adhesion between the polyester film and the magnetic layer, proposals have been made on introduction of a new component to be bonded with the reactive group in the heat-reactive compound or combined use of other type of binder. However, the magnetic recording media using the hitherto proposed binders were still unsatisfactory in adhesion between the substrate polyester film and the magnetic layer and therefore not freed of such problems as improper dispersion or orientation of the magnetic material and deterioration of mechanical strength and magnetic properties of the magnetic layer. Thus, a magnetic recording medium having good adhesion between the substrate polyester film and the magnetic layer has been desired.

The present inventors have pursued studies for providing a magnetic recording medium markedly improved in adhesion between the substrate polyester film and the magnetic layer and as a result, it has been found that a magnetic recording medium obtained by forming on both sides or one side of the substrate polyester film a coating layer comprising a polyurethane having anionic group or a mixture of a polyurethane having anionic group and a polyester having sulfonic group, and then forming a magnetic layer, especially an electron radiation cured magnetic layer on the coating layer, was remarkably improved in adhesion between the substrate polyester film and the magnetic layer as compared with the conventional magnetic recording media. The present invention has been attained on the basis of this finding.

SUMMARY OF THE INVENTION

In the first aspect of the present invention, there is provided a magnetic recording medium comprising a polyester film having on both sides or one side thereof a coating layer comprising a polyurethane having anionic group or a mixture of a polyurethane having anionic group and a polyester having sulfonic group, and an electron radiation cured magnetic layer formed on said coating layer.

In the second aspect of the present invention, there is provided a process for producing a magnetic recording medium, which comprises applying a coating liquid comprising a polyurethane having anionic group or a mixture of polyurethane having anionic group and a polyester having sulfonic group on both sides or one side of a polyester film;

stretching the coated film longitudinally or transversely or in both directions; and applying on the formed coating layer an electron radiation curable magnetic material and irradiating with electron radiation to form a magnetic layer.

DETAILED DESCRIPTION OF THE INVENTION

The polyester film used in the present invention is preferably one formed from polyethylene terephthalate in which 80% by mole or more of the constitutional repeating units is made up of ethylene terephthalate units or polyethylene naphthalate in which 80% by mole or more of the constitutional repeating units is made up of ethylene naphthalate units. As the copolymerization components other than ethylene glycol, terephthalic acid, ester thereof, naphthalenedicarboxylic acid and ester thereof, there can be used diethylene glycol, propylene glycol, neopentyl glycol, 1,4-butylene glycol, 1,4-cyclohexanedimethanol, polyethylene glycol, polytetramethylene glycol and the like as diol component, isophthalic acid, 5-sodiosulfoisophthalic acid, adipic acid, sebacic acid and their ester-forming derivatives as dicarboxylic acid component, and hydroxybenzoic acid and its ester-forming derivatives as hydroxycarboxylic acid component. These were cited as typical examples and other materials may be similarly used.

The intrinsic viscosity of the polyester used in the present invention is preferably in the range of 0.50 to 0.80, more preferably 0.55 to 0.70, in view of mechanical strength and film forming properties.

The polyester film used in the present invention may contain inorganic particles, organic particles, organic lubricant, antistatic agent, stabilizer, dye, pigment, organic polymer and the like as desired. For instance, it is commonly practiced to add fine particles into the polyester film to afford lubricity to the polyester film. In this case, it is possible to obtain a polyester film having a surface roughness suited to the purpose of use of the produced magnetic recording medium by adding the fine particles by a known way while giving consideration to the type, size and blended amount of the fine particles and the film forming conditions so as not to adversely affect the magnetic properties of the recording medium.

In the present invention, it is also possible to use a polyester film with a small content of oligomer, produced by using a polyester obtained by solid phase polymerization.

Further, the polyester film used in the present invention may be a two-layer or three-layer laminate film designed for improving surface roughness, adhesion, antistatic properties, light-shielding effect, etc.

As the polyurethane having an anionic group used in the present invention, known polyurethane resins such as disclosed in Japanese Patent Publication Nos. 24194/67, 7720/71, 10193/71 and 37839/73, and Japanese Patent Application Laying-Open (KOKAI) Nos. 126058/78 and 138098/79, and other polyurethane resins similar thereto can be employed.

The term "anionic group" in the polyurethane used in the present invention refers to such groups as $-SO_3H$, $-OSO_3H$, $-COOH$ and ammonium salt, lithium salt, sodium salt, potassium salt or magnesium salt thereof. The main components of the polyurethane are polyisocyanate, polyol, chain extender and crosslinking agent.

Examples of polyisocyanate usable as a polyurethane component in the present invention are tolylene diisocyanate, phenylene diisocyanate, 4,4'-diphenylmethane diisocyanate, hexamethylene diisocyanate, xylylene diisocyanate, 4,4'-dicyclohexylmethane diisocyanate, isophorone diisocyanate and the like.

Examples of polyol usable in the present invention are polyether polyols such as polyethylene glycol, polypropylene glycol and polytetramethylene glycol; polyester polyols such as polyethylene adipate, polyethylene-butylene adipate and polycaprolactone; acrylic polyols, castor oil, and the like.

Examples of chain extender or crosslinking agent usable in the present invention are ethylene glycol, propylene glycol, butanediol, diethylene glycol, trimethylolpropane, hydrazine, ethylenediamine, diethylenetriamine, 4,4'-diaminodiphenylmethane, 4,4'-diaminodicyclohexylmethane and water.

The polyurethane having anionic group can be produced by, for example, a method using the compounds having anionic group as the polyurethane constituents, namely polyol, polyisocyanate, chain extender, etc., a method in which the unreacted isocyanate group of the produced polyurethane is reacted with a compound having anionic group, or a method in which the group having active hydrogen in polyurethane is reacted with a compound having anionic group.

In the method using the compounds having anionic group as the polyurethane constituents, there can be used, for example, the compounds obtained by sulfonating aromatic polyisocyanates, diaminocarboxylates, salts of sulfates of amino-alcohols, and the like.

In the method in which the unreacted isocyanate of polyurethane is reacted with a compound having anionic group, there can be used, for example, bisulfites, aminosulfonic acid and salts thereof, amino-carboxylic acid and salts thereof, sulfuric esters of amino-alcohols and salts thereof, hydroxyacetic acid and salts thereof, and the like, as the compound having anionic group.

In the method where the group having active hydrogen in polyurethane is reacted with a compound having anionic group, there can be used, for example, the 3- to 7-membered cyclic compounds having the basic groups or the groups capable of forming salts after ring opening, such as dicarboxylic acid anhydrides, tetracarboxylic acid anhydrides, sultone, lactone, epoxycarboxylic acid, epoxysulfonic acid, 2,4-dioxo-oxazolidine, isatonic acid anhydrides, phostone, carbyl sulfate, and the like as the compound having anionic group.

The molecular weight of the polyurethane having anionic group is preferably 300 to 20,000. As the polyurethanes, a polymer comprising a polyol, a polyisocyanate, a chain extender having active hydrogen atoms and a compound having at least one group reactive with the isocyanate group and at least one anionic group is preferable.

The amount of the anionic group in the polyurethane having anionic group is preferably 0.05 to 8% by weight. If the amount of the anionic group is less than 0.05% by weight, the water solubility or dispersibility of the polyurethane having anionic group is poor, while if the amount of the anionic group is more than 8% by weight, the undercoat layer of the coated polyester film is deteriorated in water resistance or absorbs water to cause blocking of the films.

In the present invention, the polyester having sulfonic group is used together with the polyurethane having anionic group to remove the shortage of spreadability on the substrate polyester film or adhesiveness of the magnetic layer to the substrate polyester film which might be caused due to the molecular structure of the polyurethane having anionic group. In case the polyurethane having anionic group contains many ester units, it may not be necessary to blend the polyester having sulfonic group to the polyurethane having anionic group in the present invention.

As such polyester having sulfonic group, there can be used the known polyesters such as disclosed in Japanese Patent Publication No. 40873/72 and Japanese Patent Application Laying-Open (KOKAI) Nos. 83497/75, 121336/75 and 155640/77 or other polyesters similar thereto.

The term "sulfonic group" is used in the present invention to refer to $-SO_3H$ and basic groups with such metals as lithium, sodium, potassium, magnesium, etc.

As the dicarboxylic acid component of the polyester having sulfonic group, aromatic dicarboxylic acids such as terephthalic acid, isophthalic acid, 2,6-naphthalenedicarboxylic acid, etc., and ester-forming derivatives thereof, and aliphatic dicarboxylic acids such as adipic acid, azelaic acid, sebacic acid, etc., and ester-forming derivatives thereof can be used. As the hydroxymonocarboxylic acid component, hydroxybenzoic acid and ester-forming derivatives thereof can be used.

Aliphatic, alicyclic and aromatic diols can be used as the glycol component of the polyester having sulfonic group. Examples of such diols are ethylene glycol, 1,4-butanediol, diethylene glycol, triethylene glycol, 1,4-cyclohexanedimethanol, p-xylenediol and the like. Poly(oxyalkylene) glycols such as polyethylene glycol, polypropylene glycol, polytetramethylene glycol and the like are also usable.

As the polyester for the polyester having suffonic group, there can be used not only the saturated linear polyesters comprising the above polyester components but also the branched polyesters comprising the compounds having three or more ester-forming groups as well as the polyesters having reactive unsaturated groups.

The polyester having sulfonic group can be produced by using the compounds having sulfonic group as the polyester constituent. It is preferred to use the dicarboxylic acids, especially aromatic dicarboxylic acids having sulfonic group. Examples of such compounds are sulfoisophthalic acid, sulfoterephthalic acid, sulfonaphthalene-2,6-dicarboxylic acid, ester-forming derivatives thereof and metal salts thereof. Preferred examples of the metal salts are the salts of lithium, sodium, potassium, magnesium and the like. Among these compounds, 5-sodiosulfoisophthalic acid and 5-sodiosulfodimethyl isophthalate are most preferred.

As another means for introducing the sulfonic group into the polyester, there can be used a method in which the unsaturated group of the polyester produced from an ethylenic unsaturated compound as a copolymerization component is sulfonated with a sulfonating agent such as sodium hydrogen sulfite or sodium metabisulfide.

The dicarboxylic acid component of the polyester having sulfonic group preferably comprises 50 to 100% by mole of an aromatic dicarboxylic acid for elevating the softening point and improving the adhesiveness thereof to the substrate polyester film and the magnetic layer.

The molecular weight of the polyester having sulfonic group is preferably 5,000 to 20,000.

The amount of the sulfonic group in the polyester having sulfonic group is preferably 2 to 40% by mole based on the number of mole of the constitutional repeating unit, in view of the solubility and dispersibility of the polyester having sulfonic group in water. If the amount of the sulfonic group is less than 2% by mole, the water solubility or dispersibility of the polyester having sulfonic group becomes unsatisfactory, while if it is more than 40% by mole, the undercoat layer of the polyester film after coating is poor in water resistance or may absorb water to cause blocking of the films.

Further, it is preferable to use the dicarboxylic acid having sulfonic group or the ester-forming derivative thereof in an amount of 2 to 20% by mole in the dicarboxylic acid component.

As the polyester for the polyester having sulfonic group, there can be used not only the saturated linear polyesters comprising the above polyester components but also the branched polyesters comprising the compounds having three or more ester-forming groups as well as the polyesters having reactive unsaturated groups.

In case of using a mixture of a polyurethane having anionic group and a polyester having sulfonic group in the present invention, the mixing ratio thereof is preferably 30:70-100:0, preferably 50:50-100:0 by weight.

If the mixing ratio of the polyurethane having anionic group is less than 30% by weight, no satisfactory adhesion is provided between the substrate polyester film and the electron radiation cured magnetic layer.

In accordance with this invention, a polyurethane having anionic group or a mixture of a polyurethane having anionic group and a polyester having sulfonic group is applied to a polyester film as a coating fluid using, for instance, water as main medium. The coating fluid may contain an organic compounds such as alcohols, cellosolves, N-methylpyrrolidone, etc. in addition to water for the purpose of improving the coagulation stability of the polyurethane having anionic group and the polyester having sulfonic group, spreadability to the polyester film, filmforming properties, etc.

The coating fluid used in the present invention may also contain a methylol- or alkylol- urea, melamine, guanamine, acrylamide or polyamide, epoxy compound, aziridine compound, block polyisocyanate, silane coupling agent, titanium coupling agent, zircoaluminate coupling agent, vinyl compound which can be activated in reactivity by heat, peroxide, activation rays, etc., photosensitive resin or other like compounds as crosslinking agent for improving the blocking properties to the substrate polyester and the magnetic layer, water resistance, solvent resistance and mechanical strength of the coating layer. The coating fluid used in the present invention may further contain silica, silica sol, alumina, alumina sol, zirconium sol, kaolin, talc, calcium carbonate, titanium oxide, barium salt, carbon black, molybdenum sulfide, antimony oxide sol and the like as inorganic fine particles for improving the blocking properties and lubricity. The coating fluid used in the present invention may also contain, as desired, an organic polymer, defoaming agent, spreadability improver, thickening agent, antistatic agent, organic lubricant, organic polymer particles, antioxidant, ultraviolet absorber, foaming agent, dye, pigment and the like.

The electron radiation cured magnetic layer in the present invention is formed by applying a magnetic coating material, obtained by dispersing a magnetic material and an electron radiation curable compound in a medium and filtering out the agglomerates, on the coating layer on both sides or one side of the substrate polyester film and subjecting the magnetic coating layer to magnetic orientation and electron radiation irradiation. Typical examples of magnetic material usable in the present invention are iron oxide, chromium oxide and barium ferrite. As the electron radiation curable compound, there can be used monofunctional or polyfunctional acrylic monomers, acrylic prepolymers such as polyol acrylate, polyester acrylate, epoxy acrylate, polyurethane acrylate, polyether acrylate, acrylate alkyd, polyacetal acrylate, silicone acrylate, melamine acrylate, etc., unsaturated polyesters, unsaturated polybutadienes, and the like.

In order to facilitate dispersion, filtration, coating, orientation, etc., a solvent of the type generally used, such as toluene, cyclohexane, tetrahydrofuran, methyl ethyl ketone, methyl isobutyl ketone and the like may be used. Further, the magnetic coating material may contain the generally used types of dispersant, abrasive, lubricant, antistatic agent, non-curing high-polymeric binder and the like.

Various methods, such as mentioned below, are available for coating the coating fluid on a substrate polyester film in the present invention. Namely, the coating fluid is applied on a non-stretched polyester film by using a reverse roll coater, gravure coater, rod coater, air doctor coater or other coating apparatus as described in Yuji Harasaki "Coating Systems", Maki Shoten, 1979, and the coated film is biaxially stretched successively or simultaneously, the coating fluid is coated on a monoaxially stretched polyester film, and then the film is further stretched in the direction perpendicular to the previously stretched direction; or the coating fluid is coated on a biaxially stretched film and then the film is further stretched transversely and/or longitudinally. In any of these methods, the stretching is conducted at a temperature of perferably 60° to 130° C. The stretched film is heat set (heat treated) at 150° to 250° C.

It is also preferable to relax the oriented film by 0.2 to 20% in both longitudinal and transverse directions in the maximum heat set temprrature zone or the cooling zone at the outlet of heat treatment section.

The stretch ratio of the biaxially stretched film used as base film of the magnetic recording medium of the present invention is at least 4 times, preferably 6 to 20 times in terms of surface area.

It is especially preferred to employ a method in which the coating liquid is applied on a monoaxially stretched film which has been stretched 2 to 5 times by a roll stretching method at 60° to 130° C., and then, after drying or without drying, said monoaxially stretched and coated polyester film is immediately stretched 2 to 5 times at 80° to 130° C. in the direction perpendicular to the initial stretching direction, and then heat treated (heat set) at 150° to 250° C.

According to this method, drying of the coating layer can be effected simultaneously with stretching and also the thickness of the coating layer can be reduced in accordance with stretch ratio, so that it is possible to obtain a high-performance film having a coating layer at a relatively low cost.

The coating layer may be provided either on one side alone or on both sides of the polyester film. In case the coating layer is provided on one side alone, a coating layer other than that of the present invention may be provided on the other side for imparting the specific properties such as adhesiveness, lubricity, antistatic properties, printing properties, etc., to the polyester film.

Also, a surface treatment such as a chemical treatment or electrical discharging treatment may be applied to the polyester film before coated with the coating liquid, so as to improve the spreadability of the coating liquid to the film or the adhesiveness of the coating layer to the polyester film.

The thickness of the coating layer on the biaxially oriented polyester film is preferably in the range of 0.01 to 1$\mu$, more preferably 0.01 to 0.1$\mu$. If the thickness of the coating layer is less than 0.01$\mu$, it becomes difficult to form a uniform coating layer, resulting in unevenness of coating or insufficient adhesion between the polyester film and the magnetic layer. On the other hand, if the thickness of the coating layer exceeds 1$\mu$, the films become liable to blocking or sticking to each other, making it difficult to handle the films.

The thickness of the polyester film depends on the purpose of use, but usually it is in the range of 5 to 500$\mu$. Especially, a thickness of 5 to 25$\mu$ is preferred for magnetic tapes, 25 to 100$\mu$ for magnetic discs and 100 to 300$\mu$ for magnetic cards.

The magnetic recording medium according to the present invention can be obtained by coating a magnetic coating material on the coating layer comprising a polyurethane having an anionic group or a mixture of polyurethane having an anionic group and a polyester having a sulfonic group on both sides or one side of a polyester film, and subjecting the thus formed coating layer to magnetic orientation and electron radiation irradiation to form a cured magnetic layer.

In this process, an electric discharging treatment may be applied on the coating layer of the polyester film for improving the spreadability and adhesion of the magnetic coating material.

Curing by electron radiation irradiation can be effected in a known way, for example, by using the apparatus and method described in "POLYMER NO TOMO" (Handbook of Polymers), Vol. 20, No. 9, pp. 545–590, 1983, by irradiating electron radiation of preferably 1 to 30 Mrad.

The thickness of the magnetic layer depends on the purpose of use of the produced magnetic recording medium, but usually it is preferably in the range of 1.5 to 7$\mu$.

A printed layer may be provided on the coating layer of the polyester film according to uses of the magnetic recording medium.

Such printed layer is formed on the coating layer of the polyester film according to a known method such as screen printing, offset printing, gravure printing, etc., by using, for example, a solvent type ink made by using nitrocellulose, polyester, vinyl chloride-vinyl acetate copolymer, polyurethane or the like as binder, an air curing type ink made by using tung oil, linseed oil or the like as binder, or an ultraviolet or electron radiation curing type ink using acrylic monomer, acrylic oligomer, epoxy acryl, polyester acryl, polyurethane acryl or the like as binder. The thickness of the printed layer depends on the purpose of use of the magnetic recording medium, but preferably it is 0.5 to 15$\mu$.

The present invention will be explained more in detail while referring to the following non-limitative examples.

The adhesiveness between the magnetic layer and the polyester film was evaluated by the following method.

Adhesiveness of magnetic layer

In the case of magnetic tapes (with a film thickness of less than 25$\mu$), a 17.7 mm wide Scotch Tape (trade name) made by SUMITOMO 3M was stuck on the magnetic layer surface and subjected to a T-peel test by using a tensile tester.

In the case of magnetic discs (with a thickness of 50$\mu$ and 70$\mu$), the peel tests and endurance test were conducted by using the following methods. The surface of the magnetic layer was rubbed with a coin and the peel of the magnetic layer was observed. A 18 mm wide and 7 cm long NICHIBAN Cellotape (trade name) was stuck on the magnetic layer surface, then after fixing the film, a 500 g weight was attached to one end of the cellophane tape and when the weight was allowed to fall with gravity through a distance of 45 cm, the peel of the cellophane tape in the direction of 180° began to observe the peel of the magnetic layer. A load of 100 g was applied to the magnetic disc in addition to the load of the magnetic head and the peel of the magnetic layer in a disc drive was observed.

In the case of magnetic cards (with the thickness of 100–300$\mu$), the above-said peel test with a coin and rapid peel test with a cellophane tape were conducted.

EXAMPLE 1

Polyethylene terephthalate was melt extruded at 285° C. and cast onto a 60° C. cooling drum to obtain a 200$\mu$ thick film. This film was stretched 3.5 times longitudinally at 95° C. On one side of this stretched film was applied a coating liquid composed of 80 parts (by weight as solid matter; hereinafter the same will be employed) of HYDRAN AP-400 (trade name, made by DAI-NIPPON INK CHEMICAL INDUSTRY), which is a polyurethane having carboxylic salt group, and 20 parts of FINETEX ES-670 (trade name, made by DAI-NIPPON INK CHEMICAL INDUSTRY), which is a polyester having sulfonic salt group, and the coated film was immediately stretched 3.7 times in the transverse direction at 110° C. and subjected to a heat treatment under tension at 220° C. The thickness of the substrate polyester film was 15μ and that of the coating layer was 0.04μ.

Then a magnetic coating material composed of 70.0 g of γ-Fe$_2$O$_3$, 8.4 g of urethane acrylate produced from isophorone diisocyanate, caprolactone polyol and 2-hydroxyethyl acrylate, 2.8 g of tetraethylene glycol diacrylate, 5.6 g of polyurethane, 3.0 g of vinyl chloride-vinyl acetate copolymer, 0.8 g of lecithin, 2.0 g of carbon and 190 g of methyl ethyl ketone, which had been subjected to a dispersion treatment, was further coated on the coating layer, and then the magnetic coating layer was subjected to magnetic orientation while drying the solvent methyl ethyl ketone, followed by irradiation of 10 Mrad electron radiation by ElectroCurtain EC-1 (trade name, made by ENERGY SCIENCE Inc.) to form a magnetic layer, thereby obtaining a magnetic tape. The thickness of the magnetic layer was 5.0μ.

The adhesive force between the polyester film and the magnetic layer of this magnetic tape was 85 g.

COMPARATIVE EXAMPLE 1

A magnetic tape was obtained in the same way as Example 1 except that no coating layer was provided. The adhesive force between the polyester film and the magnetic layer of this magnetic tape was 13 g.

It was thus found that the magnetic tape according to the present invention had good adhesion between the polyester film and the electron radiation cured magnetic layer and was suited for practical use.

EXAMPLE 2

Polyethylene terephthalate was melt extruded at 285° C. and cast onto a 60° C. cooling drum to obtain 820μ thick film. This film was stretched 3.3 times in the longitudinal direction at 95° C. On both sides of the stretched film was applied the same coaiing liquid as used in Example 1, and the coated film was immediately stretched 3.3 times in the transverse direction at 110° C. and then heat treated at 210° C. The thickness of the substrate polyester film of the thus obtained film was 75μ and the thickness of the coating layer was 0.04μ.

Then a magnetic layer was provided on the coating layers on both sides of the film in the same way as Example 1 to produce a magnetic disc.

In the test of the adhesiveness between the polyester film and the magnetic layer of this magnetic disc by rubbing with a coin, there took place only cohesive failure of the magnetic layer, and in the cellophnne tape peel test, peeling occured merely at the interface between the magnetic layer and the cellophane tape. In the endurance test with the magnetic head, the magnetic layer showed a durability of more than 120 minutes.

COMPARATIVE EXAMPLE 2

A magnetic disc was produced in the same way as Example 2 except that no coating layer was provided. In the test by a coin and the cellophane tape peel test of this magnetic disc, peeling took place at the interface between the polyester film and the magnetic layer, and in the endurance test with the magnetic head, the endurance time was less than 10 minutes.

The test results showed that the magnetic disc produced according to the present invention had good adhesion between the polyester film and the electron radiation cured magnetic layer and was fitted for practical use.

EXAMPLE 3

A magnetic disc was produced in the same way as Example 2 except that a coating liquid composed of 65 parts of IMPRANIL DLH (trade name of a polyurethane having a sulfonic salt group produced by BAYER Co., Ltd.), FINETEX ES-670 (trade name of a polyester having a sulfonic salt group produced by DAI-NIPPON INK CHEMICAL INDUSTRY), 10 parts of alkylolurea and 5 parts of silica sol was used in place of the coating liquid of Example 2.

The adhesion between the polyester film and the magnetic layer of this magnetic disc was as excellent as that of Example 2, and it was suited for practical use.

EXAMPLE 4

Polyethylene terephthalate containing titanium oxide as a white opacifier was melt extruded into a film and the film was stretched 3.0 times longitudinally at 95° C. On both sides of stretched film was applied a coating liquid composed of 65 parts of IMPRANIL DLH, 20 parts of FINETEX ES-670, 10 parts of a trifunctional aziridine compound and 5 parts of silica sol, and the coated film was immediately stretched 3.0 times transversely and heat treated at 210° C. The thickness of the substrate polyester film was 250μ and that of the coating layer was 0.04μ.

Then a magnetic layer was provided on both coating layers in the same way as Example 1 to obtain a magnetic card.

In the coin rubbing test, only cohesive failure of the magnetic layer occured, and in the cellophane tape peel test, there merely occured peeling at the interface between the magnetic layer and the cellophane tape.

COMPARATIVE EXAMPLE 3

A magnetic card was obtained in the same way as Example 4 except that no coating layer was provided. In both coin test and cellophane tape peel test, the magnetic layer peeled at the interface between the magnetic layer and the polyester film.

It was thus confirmed that the magnetic card according to the present invention had good adhesion between the polyester film and the electron radiation cured magnetic layer and was suitable for practical use.

EXAMPLE 5

Polyethylene terephthalate containing titanium oxide as white opacifier was melt extruded into a film, and the film was stretched 3.0 times in the longitudinal direction. On both sides of this film was applied a coating liquid composed of HYDRAN AP-40, a polyurethane having a carboxylic salt group produced by DAI-NIPPON INK CHEMICAL INDUSTRY, and 10 parts of silica sol, and the coated film was immediately stretched 3.0 times in the transverse direction and heat treated at 210° C. The thickness of the substrate polyester film was 188μ and that of the coating layer was 0.08μ.

Then a magnetic layer was provided on both coating layers in the same way as Example 1 to produce a magnetic card.

The adhesion between the polyester film and the magnetic layers of this magnetic card was as excellent as that of Example 4.

What is claimed is:

1. A magnetic recording medium comprising a polyester film having on both sides or one side thereof a coating layer having a thickness of 0.01 to 1μ comprising a polyurethane having anionic group or a mixture of a polyurethane having anionic group and a polyester having sulfonic group, and an electron radiation cured magnetic layer formed on said coating layer, wherein the content of said anionic group is 0.05 to 8% by weight based on the amount of said polyurethane having anionic group, the content of said sulfonic group is 2 to 40% by mole based on the number of moles of constitutional repeating units of said polyester having sulfonic group, and the mixing ratio of said polyurethane having anionic group to said polyester having sulfonic group is 30.70 to 100:0 by weight.

2. A magnetic recording medium according to claim 1, wherein said anionic group is $-SO_3H$, $-OSO_3H$, $-COOH$ or ammonium salt, lithium salt, sodium salt, potassium salt or magnesium salt thereof.

3. A magnetic recording medium according to claim 1, wherein said sulfonic group is $-SO_3H$ or lithium salt, sodium salt, potassium salt or magnesium salt thereof.

4. A magnetic recording medium according to claim 1, wherein said polyurethane having anionic group have a molecular weight of 300 to 20,000 produced from a polyol, a polyisocyanate, a chain extender having reactive hydrogen atoms, and a compound having at least one group reactive with the isocyanate group and at least one anionic group.

5. A magnetic recording medium according to claim 1, wherein the thickness of said polyester film is 5 to 500μ.

6. A magnetic recording medium according to claim 1, wherein the thickness of said magnetic layer is 1.5 to 7μ.

7. A process for producing a magnetic recording medium, which comprises
applying a coating liquid comprising a polyurethane having anionic group or a mixture of polyurethane having anionic group and a polyester having sulfonic group on both sides or one side of a polyester film:
stretching the coated film longitudinally or transversely or in both directions; and
applying on the formed coating layer an electron radiation curable magnetic material and irradiating with electron radiation to form a magnetic layer,
wherein the content of said anionic group is 0.05 to 8% by weight based on the amount of said polyurethane having anionic group,
the content of said sulfonic group is 2 to 40% by mole based on the number of moles of constitutional repeating units of said polyester having sulfonic group,
the mixing ratio of said polyurethane having anionic group to said polyester having sulfonic group is 30:70 to 100:0 by weight,
and the thickness of the coating layer is 0.01 to 1μ.

* * * * *